Sept. 1, 1931.  J. ZINKOWETSKY  1,820,958
AIRPLANE SAFETY DEVICE
Filed March 26, 1930  2 Sheets-Sheet 1
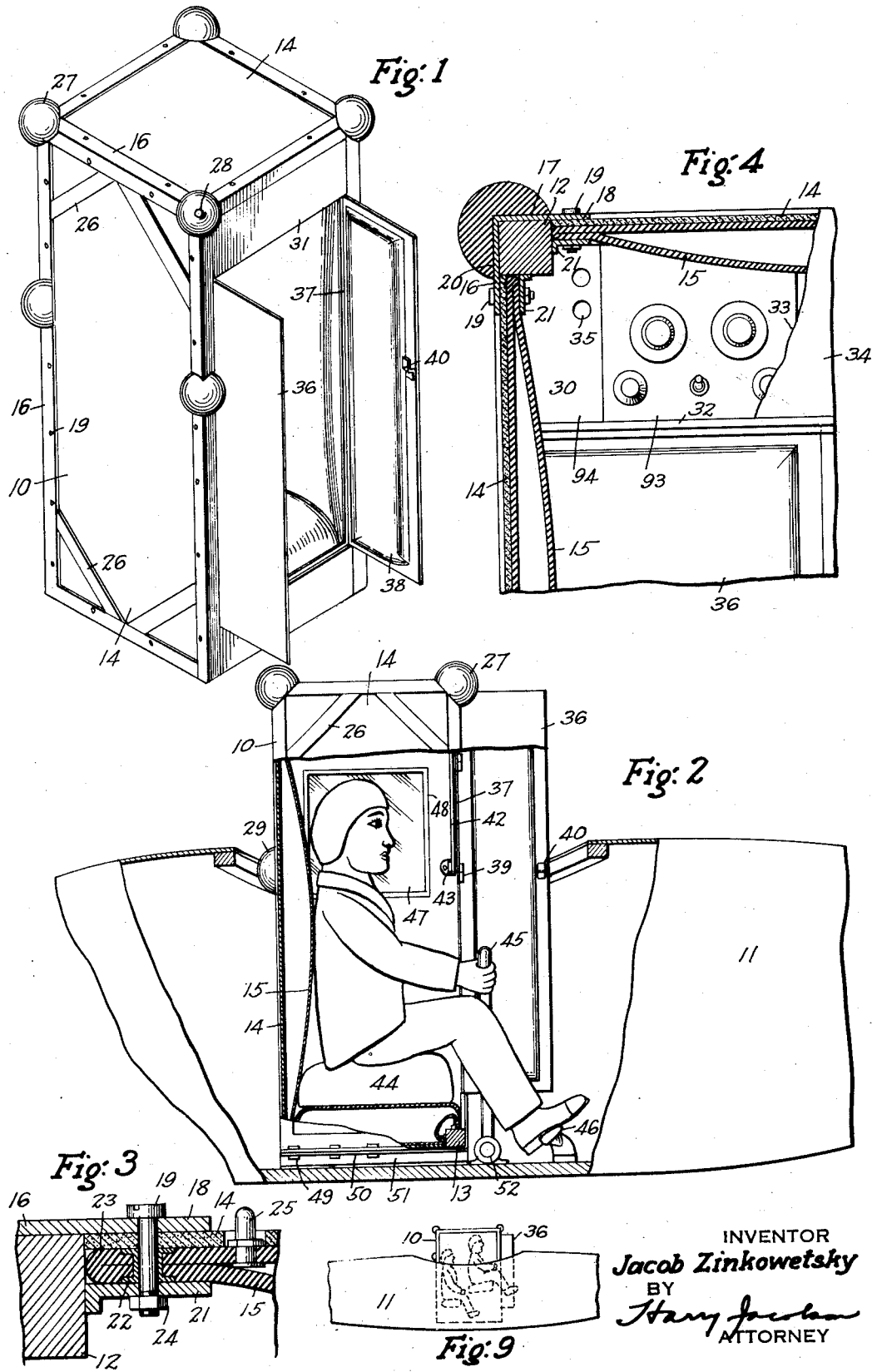
INVENTOR
Jacob Zinkowetsky
BY
Harry Jacobson
ATTORNEY Sept. 1, 1931.   J. ZINKOWETSKY   1,820,958
AIRPLANE SAFETY DEVICE
Filed March 26, 1930   2 Sheets-Sheet 2

INVENTOR
Jacob Zinkowetsky
BY
Harry Jacobson
ATTORNEY

Patented Sept. 1, 1931

1,820,958

UNITED STATES PATENT OFFICE

JACOB ZINKOWETSKY, OF NEW YORK, N. Y.

AIRPLANE SAFETY DEVICE

Application filed March 26, 1930. Serial No. 438,919.

This invention relates to safety devices for flying machines and is applicable to both land planes and sea planes.

While an aviator is frequently able to bring his plane down safely should the engine stall, emergencies frequently occur in which he is unable to do so, and in which there is no time for the pilot or passenger to use parachutes. Many accidents have occurred, for example, in fog, where the pilot is uncertain of his net altitude above the ground and runs into a mountain-side or other obstruction. Accidents also frequently occur above a large body of water and a considerable distance from land. In such cases, a parachute would be useless since the pilot or passenger will either have no time to use it, or its use would be unavailing to save him from injury. The pilot and his passenger in such cases necessarily fall with the plane and the fall frequently results in serious injury or death.

My invention contemplates the provision of means for adequately protecting the pilot or passenger or both, normally against inclement weather, and in case of accident, against the impact of a fall and against the effects of fire, to a sufficient extent frequently to make the difference between fatal injury and comparatively minor injury, or to avoid injury entirely. Briefly, my invention comprises the provision of an independent cushioned booth detachable from, or secured to the plane, and designed to cushion the blow of impact materially no matter how forceful the blow may be. My invention may be carried out in numerous ways. Its various objects will appear from the description which follows, and from the drawings, in which, Fig. 1 is a perspective view of a booth or compartment to which my invention has been applied, showing the doors thereof open in their normal positions.

Fig. 2 is a vertical section of the same as it appears secured in place in a plane.

Fig. 3 is a section through one of the corners of the frame showing the means for securing the cushions and the frame structure together.

Fig. 4 is a vertical section of the upper part of a modified form of the invention wherein an upper compartment is provided within the booth for the purpose of storing a radio set and food articles therein.

Fig. 9 is a side view of a modified form of a booth of sufficient size to hold more than one person.

Figure 5:
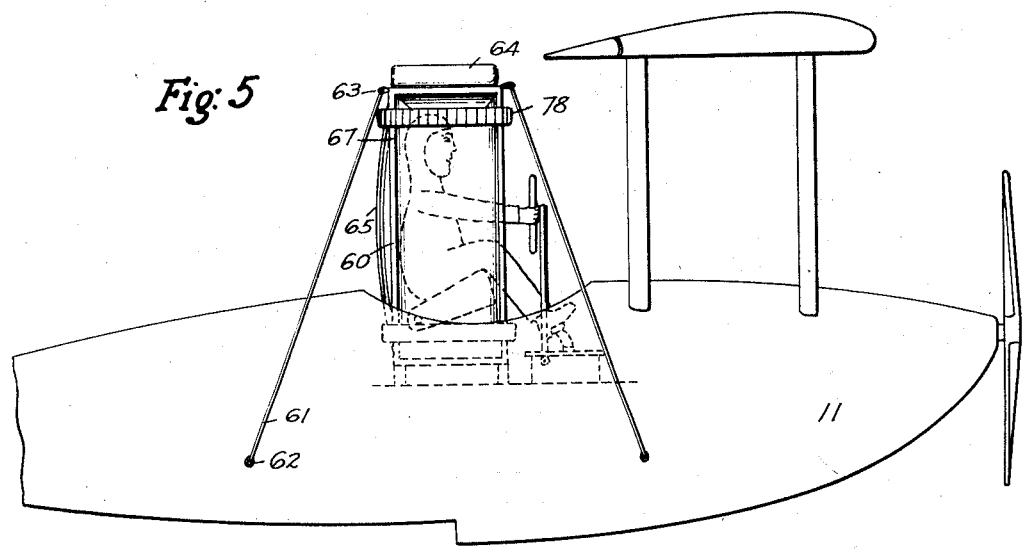
Fig. 5 is a view similar to Fig. 2 of another form of my invention wherein the booth is made quickly detachable, as for example, for use in sea planes or at a substantial altitude where a parachute might be effective.

In that particular embodiment of my invention which I have illustrated by way of example and without intention to limit myself thereto, a booth or compartment 10 preferably formed independently of the frame, and of suitable dimensions to hold at least one person therein comfortably, is designed to be secured permanently or detachably to a plane and to accommodate the pilot therein. Said booth may be suitably stream lined, if desired, to reduce the air resistance to a minimum in a manner which is well known and hence which need not be described or shown. In the construction of the booth or compartment 10, I prefer to use a comparatively rigid frame, suitably cushioned to take up shock and suitably insulated against the effects of fire. In that type of booth or compartment 10 which is designed to be secured more or less permanently to the fuselage 11 against normal detachment, the cushioning means is arranged on the inside of the booth.

As shown in Fig. 4, the frame may consist of suitable corner posts as 12 made of metal or other strong and comparatively rigid material, the upright posts 12 being suitably connected at their upper ends and at their lower ends by cross rails as 13. In order to provide means for the attachment of the fire-proof covering such as the asbestos sheet 14, and for the attachment of the air inflatable flexible cushions as 15 to the inside of the frame work, suitable angle irons or angles as 16 are arranged about and secured to the exterior surfaces of the posts 12 and the rails 13. One leg 17 of each angle projects beyond the inner edge of the post or rail to provide an extension 18 for the reception of the bolts 19 as will be hereinafter more fully explained.

The other leg 20 similarly projects beyond the post or rail for the same purpose. An interior strip or plate as 21 is suitably perforated (Fig. 3) for the reception of the bolt 19, said bolt passing through the fire-proof sheet covering 14 and through a suitable eyelet as 22 fastened to and securing the edges 23 of the cushions 15 in place. It will be seen that by tightening the nut 24 of the bolt 19, the fire-proof covering 14 and the cushion edge 23 are suitably clamped between the extension 18 of the angle 16 and the plate 21, and that the cushion and covering thereby form the various walls of the booth.

The air valve 25 communicating with the interior of the cushion 15 is provided whereby the cushion may be suitably inflated from the outside before the plane takes off, if desired.

It will be understood that the interior walls as well as the top and bottom of the booth 10 are composed of cushions 15 so that should the plane fall and strike the ground, the shock of the fall upon the occupant of the booth is largely taken up by the inflated cushions even though the booth may be wrenched out of the plane and even though the booth may be subjected to such stress and shock as to distort it substantially. To strengthen the frame, cross braces as 26 may be provided as indicated in Figs. 1 and 2 at all of the corners of the top, bottom and side walls, said braces joining and bracing the posts 12 to the rails 13. Additional intermediate vertical and horizontal braces may also be provided, if desired, between the various posts and rails for the same purpose.

At the upper corners or edges of the booth or compartment 10, I prefer to provide corner bumpers as 27 preferably of resilient material such as rubber, reinforced with springs, if desired and secured in position by suitable rivets as 28 or straps as may be desired. In the arrangement of the booth shown in Fig. 2, additional bumpers as 29 may be provided intermediate of the ends of the booth to protect the booth should it fall with the plane.

As shown in Figs. 1 and 4, an uppermost compartment 30, designed to occupy the upper front corner of the booth may be provided. Said compartment comprises the front plate 31, the shelf 32, and a removable interior plate 33 having a cushion 34 projecting into the interior of the booth and arranged in a proper position to avoid interference with the occupant should he stand upright. The compartment 30 may be used for various purposes, such as to receive the radio transmitting instrument 93 and to provide a suitable food compartment as 94. Openings as 35 may also be provided in the compartment 30 communicating with the outer air for ventilating the interior of the booth when the doors 36 are closed.

A suitable ledge or rim 37 is arranged about the inner periphery of the front wall of the booth to serve as a stop for the doors 36 whereby said doors are prevented from swinging inwardly into the interior of the booth under stress or strain. The doors 36 are constructed similarly to the walls of the booth, being provided with suitable interior cushions 38 inflatable from the outside. Said doors are hinged to the front angles 16 and swing outwardly, being normally retained in their open position in any suitable manner as by friction or by the spring hinges 39. Each of the doors is provided with a suitable latch, hook or catch, as 40 intended to receive the swingable bar 42 pivoted to a wall of the booth as at 43 and intended to swing downwardly into the latches 40 to maintain the doors in their closed positions in case of accident. Normally, the pilot may sit on the cushion 44 and by stretching his hands and feet through the door opening, may operate the controlling mechanisms 45 and 46 of the plane.

In one or both of the side walls of the booth, a window as 47 of suitable transparent, non-inflammable and non-fragile material such as mica, may be inserted, said window being retained in place by a suitable frame 48 braced to the posts 12, an opening in the cushion being made for that purpose. It will be understood, however, that the window 47 may be omitted, if desired. The booth may be secured in place to the fuselage 11 as by means of the bolts 49 secured to the flange 50 of the channel 51 which is in turn, attached to the bottom of the fuselage.

In case of accident or when accident is imminent, the pilot may swing the operating lever 45 forwardly about its hinge 52 out of the way of the doors and may then close the doors 36, securing them in place by dropping the bar 42 into the latches 40. In case of a crash, the bumpers 27 and 29 offer some protection and absorb some of the shock, the remaining shock being absorbed by the inflated cushions 15 and 38 should the body of the pilot be thrown against the cushions.

In this form of my invention, the booth 10 falls with the plane and even though forcibly broken away from the plane, the body of the pilot is protected to a substantial extent by the interior inflated cushions, the protection being sufficient to make the difference between serious and minor injury or between death and injury, particularly where accidents are unavoidable and there is no time for the pilot to use a parachute. If the doors become jammed, or if the booth falls in such a position that the occupant cannot open the doors, he may readily cut his way out of the booth by ripping through the cushions and the covering forming the walls as by means of a knife, the fire-proof covering 14 offers substantial protection should the plane fall in flames, or should fire start after the plane has fallen.

Figure 6:
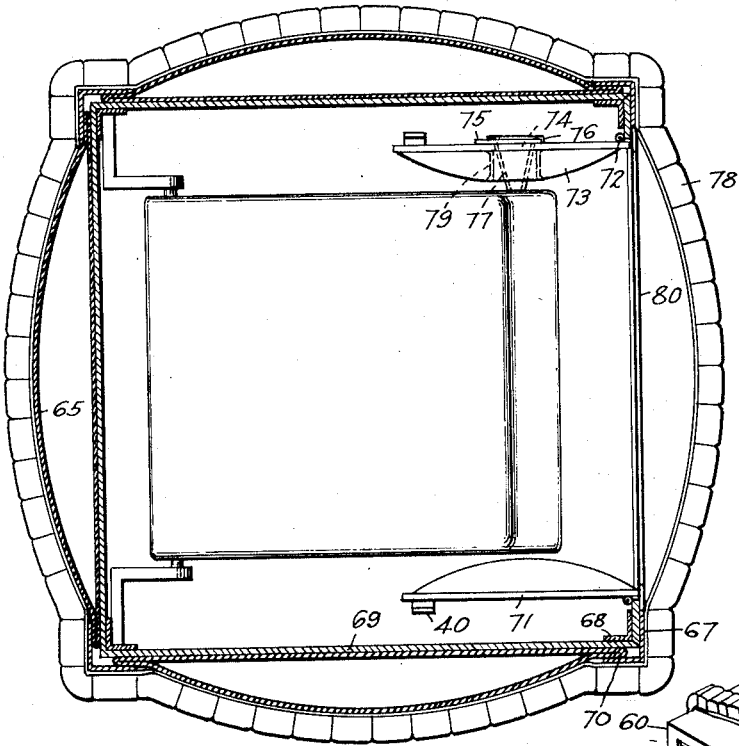
Fig. 6 is a horizontal section of a modified form of my invention adapted for use with a detachable booth designed to float in water.
Figure 8:
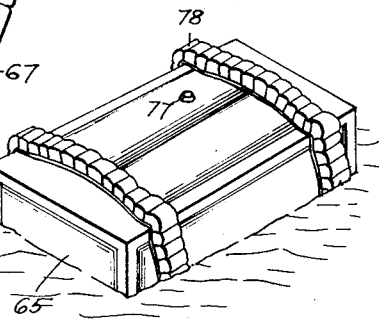
Fig. 8 is a perspective view of the booth as it appears detached from the plane, closed up, and floating in water.
Figure 7:
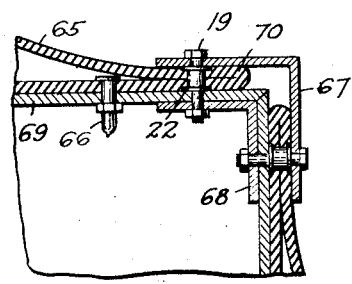
Fig. 7 is a section of the modified form of the booth shown in Figs. 5 and 6.

In that modification of my invention illustrated in Figs. 5 to 8 inclusive, the separable booth 60 is intended to be used in connection with a sea plane, or in connection with a land plane where it is desired to provide for quick detachment from the plane. The booth 60 is therefore maintained in place normally by means of quick detachable or severable means, such as the ropes 61 secured at their ends to the fuselage as at 62, and passing through suitable rings as 63 near the top of the booth.

A parachute as 64 may be arranged on the top of the booth and may be secured in place for quick opening in the usual manner, said parachute being suitably attached to the booth for aiding in controlling its descent when detached from the plane.

In that form of my invention now being described, the cushions 65 are preferably arranged on the outside of the various rails and posts and the inflating valves 66 directed towards and extending into the interior of the booth for inflation from the inside. A pair of angle irons or angles 67 and 68 are therefore arranged in parallel relation about the frame 69 with the edges 70 of the cushion 65 held therebetween as by means of the bolt 19 passing through the eyelet 22 and through suitable perforations in the angles. The food and radio compartment 30 hereinbefore described in connection with Fig. 4 is provided for the purposes mentioned. The doors 71, however, are hinged as at 72 to swing forwardly into their closed position, and are cushioned on the outside as by means of the cushion 73. The doors 71 are closed in emergencies about their hinges, being held in place similarly to the doors 36 by means of the bar 42 engaging the latches 40. A suitable stop ledge 80 secured about the outside of the door opening limits the outward movement of the doors. At least one of said doors is provided with an opening 74, normally covered with a slidable plate 75 designed to be rotated in the plane thereof and retained by the frame 76 in position to expose the opening when desired. Said opening is further protected against the entrance of water by means of the cone 77, secured in place on the exterior of the door at the opening 74, and passing through the cushion 73, which is provided with a suitable wall 79 arranged about the opening 74 to allow the passage of the cone 77.

In cases of emergency, to free himself of the plane, the pilot need merely lean forward to cut the ropes 61. He then closes the doors 71 and drops the bar 42 into position. The booth then being free of or unsecured to the plane, the pilot, by leaning sideways, causes the booth to topple from the plane, the booth being arranged to project sufficiently out of the plane for that purpose. The parachute 64 being freed, said parachute opens and checks the rapid descent of the booth to the surface of the water. The booth being watertight, it may serve as a boat for sustaining the pilot for an indefinite period, the inflating cushions serving not only to absorb the shock of contact with the water but serving further to aid in floating the booth. For further aiding in this purpose, the belts 78 composed of canvas filled with cork in the manner of the well known cork life preservers, may be strapped about the booth and about the cushions. When convenient or necessary to do so, the occupant may slide the plate 75 into position to expose the opening 74 so that he may obtain air while waiting for rescue. He may also operate the set to send out signals, and he has access to the food stored in the food compartment to sustain life for a considerable period.

It will be understood that the pilot enclosed in the booth may bring the opening 74 above the surface of the water by rolling about, shifting the center of gravity and thereby causing the booth to roll in the water into the proper position. He may then, if he desires, open the doors 71 inwardly for purposes of observation and for manipulating the booth in the water to a certain extent.

It will be seen that if desired, the parachute 64 may be applied to the booth 10 and that said booth 10 may be made detachable in the same manner as the booth 60, to adapt the booth to be used in land planes. It will further be understood that either of the booths 10 or 60 may be elongated as shown in Fig. 9, for the reception of a plurality of passengers, one behind the other, or that the booths may be widened laterally to receive one or more passengers alongside of the pilot. In such cases, the booths are reinforced by additional posts in a manner which will be obvious to those skilled in the art.

It will further be understood that I have provided a safety device for planes designed to protect the occupant against inclement weather, and against accidents due to fire, fall or collision, and that while I have shown and described certain specific embodiments of my invention, I do not wish to be understood as limiting myself thereto but intend to claim my invention as broadly as may be permitted by the state of the prior art and the terms of the appended claims.

I claim:

1. The combination with an airplane, of an independent normally open compartment for the reception of an occupant, comprising a frame having elongated laterally spaced rigid members, inflatable cushioning means secured at their edges to said members, and forming the walls of the compartment to said members, and doors arranged to be closed for substantially sealing the compartment.

2. The combination with an airplane, of an independently formed booth comprising a braced skeleton frame having angle members outlining the top, bottom and sides of the booth, air inflatable cushions secured to the members and forming the walls thereof, normally open hinged and cushioned doors at the front of the frame, and removable means for maintaining the doors in closed position in emergencies.

3. The combination with an airplane, of substantially rigid corner posts, means for bracing said posts for forming therewith a skeleton frame having side walls, a rear wall, a top and bottom, air inflatable cushions secured to the frame and forming part of the walls thereof, normally open doors in the front wall of the frame, air inflatable cushions for said doors and locking means for maintaining said doors in closed position in emergencies.

4. The combination with an airplane, of an independent booth detachably secured to the plane, each of the walls of the booth comprising an inflatable cushion and an asbestos sheet, and peripheral rigid members secured to and outside of the edges of the cushion and the sheet.

5. The combination with an airplane, of an independent cushioned booth including normally open cushioned doors adapted to be closed and locked by the occupant of the booth, and including spaced rigid upright members, similar members joining the upright members, and inflatable cushions interposed between the members, and permanently folded and secured to the members at the folds thereof.

6. The combination with an airplane, of an independent booth cushioned exteriorly and interiorly and adapted to be secured in position in the plane for the reception of an occupant, the peripheral edge portion of each of the walls of said booth comprising a rigid member exposed at the exterior of the booth.

7. The combination with an airplane, of a cushioned booth adapted to be inserted into and secured to the plane as a unit for the reception and protection of an occupant, each of the walls of the booth comprising peripheral rigid members, an inflatable cushion between said members, and means for securing the edges of the cushion to said members.

8. In an independent occupant carrying booth for airplanes, corner posts, angle members arranged about the posts, means for bracing the posts, air inflatable cushions arranged adjacent to flanges of the angle members, an elongated strip arranged adjacent to and engaging the edge portions of said cushions, and fastening means passing through said strips, said edge portions and said flanges for securing the cushions in position to form the walls of the booth.

9. An independent occupant carrying booth for airplanes comprising a substantially rigid frame, bracing members for the frame, air inflatable cushions forming the walls of the booth, a clamping strip in contact with each of the edge portions of the cushions, means passing through the strip, the edge portion and the frame for securing the parts together, normally open doors in the front wall of the booth, means for removably maintaining the doors in closed position, a food and radio compartment in the booth, and cushioning means carried on the outside of said booth.

10. The combination with an airplane, of an independent booth for the reception of an occupant, rings on the booth, cushioning means on said booth, and quick-detachable means for normally maintaining the booth in operative position in the plane and adapted to be released to allow separation of the booth from the plane comprising severable flexible members secured at their ends to the airplane and passing through the rings.

11. The combination with an airplane, of an independent cushioned booth adapted to be separated from the plane a parachute for said booth, rings at the upper part of the booth, and ropes passing through the rings and secured at their ends to the airplane.

12. The combination with an airplane, of a shock-absorbing normally open booth adapted to carry an occupant, and adapted to be sealed in emergencies and to protect the occupant from inclement weather conditions, and separable from the airplane, severable flexible members secured at their ends to the airplane, and fixed members on the booth adapted to have the intermediate portions of said flexible members passed therethrough for normally maintaining the booth in the airplane.

13. A booth for an airplane comprising top, bottom and side walls, a door in the front wall adapted when closed to close said booth completely, elongated, rigid members at the intersections of said walls and connected together to form a rigid frame, and an airproof, flattened casing arranged between and secured at its edges to the terminal rigid members of each wall to form said walls, one side of said casing having an inlet valve therein and the other side being free to expand laterally on the inflation of the casing.

14. In an occupant carrying booth for an airplane, inflatable wall-forming cushions, a rigid member forming a frame part of the booth on one side of the cushion, a rigid member on the other side of the cushion, and means for tightening said members together with the cushion therebetween.

15. In an occupant carrying booth for an airplane, a wall comprising rigid members joined together and forming the edge portions of the wall, an inflatable cushion secured to the inner faces of said members, and inflatable in a direction outwardly of said members, and cork-filled members arranged about the booth.

16. The combination with an airplane, of a substantially rigid braced skeleton frame, including a series of joined and braced structural members, air inflatable cushions forming part of each of the walls of the frame and a sheet of fire-proof material substantially co-extensive with the cushions, forming the remainder of each of the walls of the frame, and means for securing the edges of the cushions and the sheets to said members.

JACOB ZINKOWETSKY.